(12) United States Patent
Rohleder et al.

(10) Patent No.: US 11,126,573 B1
(45) Date of Patent: Sep. 21, 2021

(54) SYSTEMS AND METHODS FOR MANAGING VARIABLE SIZE LOAD UNITS

(71) Applicant: NXP USA, Inc., Austin, TX (US)

(72) Inventors: Michael Rohleder, Unterschleissheim (DE); Cristian Macario, Munich (DE); Dirk Moeller, Zorneding (DE)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/941,628

(22) Filed: Jul. 29, 2020

(51) Int. Cl.
*G06F 13/16* (2006.01)
*G06F 12/0895* (2016.01)
*G06F 13/40* (2006.01)

(52) U.S. Cl.
CPC ...... *G06F 13/1668* (2013.01); *G06F 12/0895* (2013.01); *G06F 13/4027* (2013.01); *G06F 2212/608* (2013.01)

(58) Field of Classification Search
None
See application file for complete search history.

(56) References Cited

U.S. PATENT DOCUMENTS

| 8,327,187 | B1* | 12/2012 | Metcalf | G06F 12/123 |
| | | | | 714/10 |
| 8,375,191 | B2* | 2/2013 | Kim | G06F 12/0246 |
| | | | | 711/170 |
| 9,734,064 | B2* | 8/2017 | Vorbach | G06F 12/0815 |
| 10,120,713 | B2 | 11/2018 | Rohleder | |
| 2016/0062954 | A1* | 3/2016 | Ruff | G06F 40/205 |
| | | | | 715/249 |

OTHER PUBLICATIONS

U.S. Appl. No. 16/869,249, filed May 7, 2020, 35 pages.

* cited by examiner

*Primary Examiner* — Michael Sun
(74) *Attorney, Agent, or Firm* — Mary Jo Bertani

(57) ABSTRACT

Systems and methods of managing variable size load units of application codes in a processing system include identifying pages of a random access memory (RAM) device to store copies of load units from an external memory device upon request by a bus master in the processing system. The RAM device is internal to an integrated circuit device that includes the bus masters, and the external memory device is external to the integrated circuit device. The bus masters execute the application codes, and each of the application codes comprise one or more load units that include executable program instructions. At least some of the load units have different sizes from one another. A page type indicator is determined for an identified page. A first page type indicates whether the identified page is a split page to store a segment of each of two different load units.

20 Claims, 7 Drawing Sheets

SYSTEMS AND METHODS FOR MANAGING VARIABLE SIZE LOAD UNITS

FIELD

The field of the invention relates to a memory system and a method for memory management therein that is supporting software execution in an embedded information system, such as in-vehicle (in an automotive environment).

RELATED ART

Computer systems often benefit from a hierarchical memory design, for example in which (at least partial) copies of the memory content can be stored (i.e., cached) at different levels within the memory hierarchy. Often, the hardware supporting the different memory levels has different capacities, costs, and access times. Generally speaking, faster and smaller memory circuits are often located closer to processor cores or other processing elements within the system, and serve as caches. Other types of memory storage devices in the processing system may be larger and less expensive but may also be relatively slow compared to those memories acting as caches.

BRIEF DESCRIPTION OF THE DRAWINGS

The present technology may be better understood, and its numerous objects, features, and advantages made apparent to those skilled in the art by referencing the accompanying figures.

The use of the same reference symbols in different drawings indicates similar or identical items unless otherwise noted. The figures are not necessarily drawn to scale.

DETAILED DESCRIPTION

Figure 1:
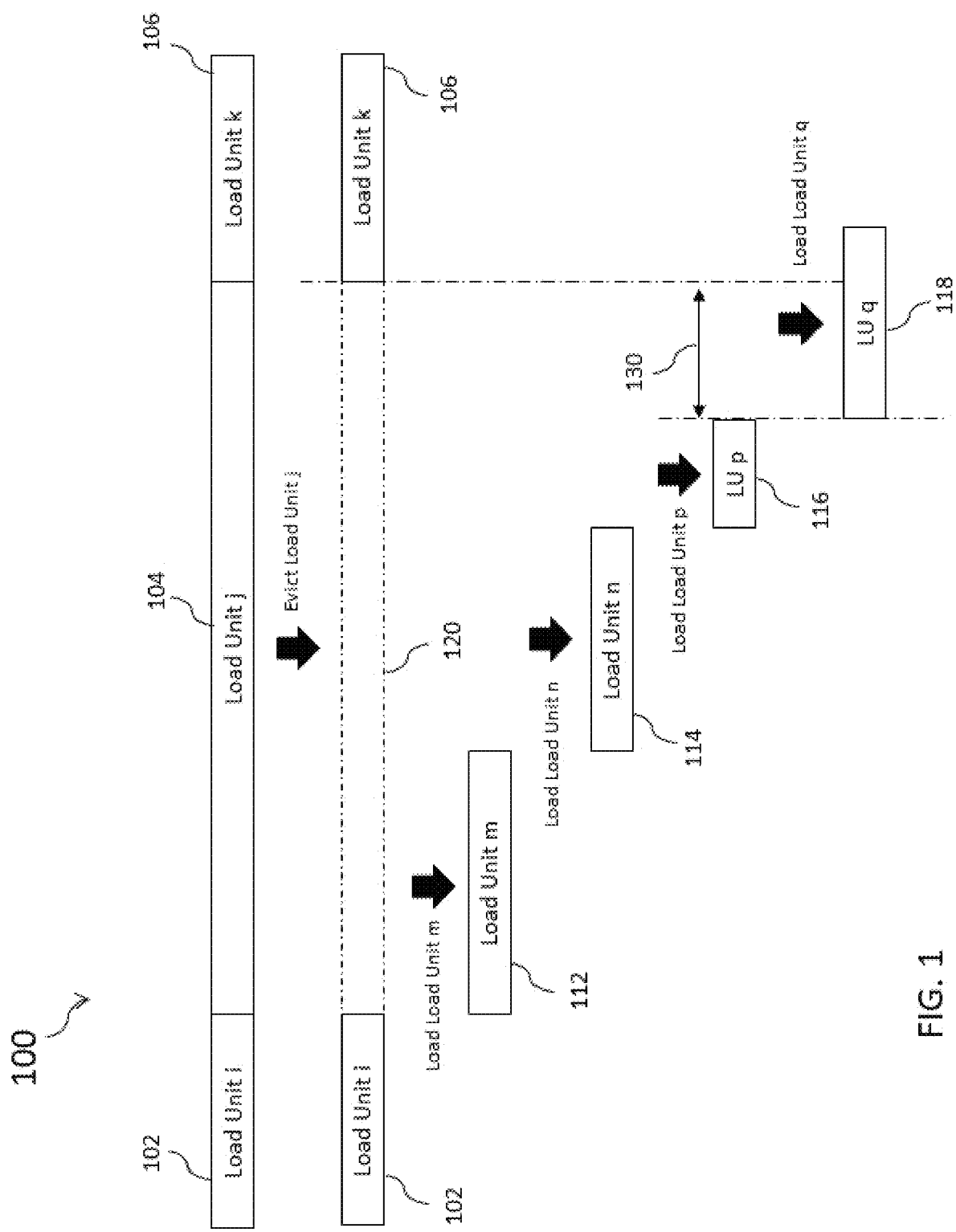
FIG. 1 illustrates a timeline of loading variable sized load units in accordance with selected embodiments of the invention.

Embodiments of systems and methods for managing cache replacement processing of variable sized load units holding executable instructions and constant data are disclosed that manage loading of the instructions and data into a buffer memory such as (random access memory (RAM)) internal to a microcontroller from a memory device external to the microcontroller. The external memory device provides larger storage for applications currently running than can be buffered within memory internal to the microcontroller. Unnecessary impact on the application code and load bandwidth is avoided by the capability to process variable sized load units. The cache operation supports execution of multiple applications in the microcontroller by multiple processor cores that may be using more than one instance of the same or different operating systems, along with other types of bus masters that access instructions or the constant data in memory. The systems and methods disclosed herein are implemented in a cache control subsystem that is further referred to as Operating System Aware Task Caching (OTC).

Unlike known processor cache arrangements that are limited to processing one size of load units for cache memory, variable size load units are supported by the cache management components disclosed herein via decoupled load request and cache eviction operations. By decoupling the request and eviction operations, one complexity of variable size load units is overcome by evicting multiple load units to provide space for a larger load unit, or the inverse case in which multiple smaller units can be loaded into the free space resulting from the eviction of a larger load unit. More than one candidate for eviction is selected in case a larger load unit is requested thereby forcing multiple load units to be evicted to provide sufficient space. The multiple candidates are appropriately managed until they are actually used, as a good eviction candidate at time X may be an unsuitable candidate at time X+Y. The complexity of managing multiple eviction candidates is significantly higher when the cache content is shared between multiple bus masters (for example, processor cores) that may be executing different instructions located in different load units located within the cache. Decoupling the eviction and request operations can also permit further optimizations of the cache behavior. For example, to optimize the contents of the large buffer memory, the most worthy data elements to be kept in the memory may be identified. Such an optimization requires one or more suitable eviction candidates to be identified in advance, which is not possible when a replacement candidate is identified on demand, as with traditional instruction caches.

As noted above, external memory can store more than one image, e.g., to support over-the-air (OTA) update of the images, where one image is holding the instructions and constant data of the applications that are concurrently executed within a microcontroller. Even providing sufficient internal memory for storing all instructions and constant data of a single image concurrently in the internal RAM of typical MCUs in addition to the RAM required for the application data may result in a RAM size that is prohibitively expensive. Before instructions of these applications can be executed within an MCU that does not employ non-volatile memory, the instructions are copied from external non-volatile memory and loaded into internal memory. An intelligent cache controller that only loads the subset of instructions and constant data that is currently in use/required by an application helps reduce the corresponding size of internal memory needed for this purpose. Such a partial buffering requires in-advance loading of the instructions to ensure their availability in time, which is distinct from traditional caches that perform on-demand loading.

While external non-volatile memory can be substantially larger than internal memory, it is usually significantly slower to access, especially the non-volatile memories suitable for an embedded system within an in-vehicle automotive environment. The situation may be compounded in a multi-core system where multiple processor cores want to access the instruction memory at the same time. This issue is viewed in light of an internal memory which may already having a limiting performance as is obvious by the need of Level 1/Level 2 processor caches in todays embedded systems. Any slower access can present challenges to the timing requirements of an operating system that has to execute tasks in real time, especially the usual embedded systems in the automotive world that have to adhere to very stringent real-time conditions. For example, when implementing breaking, airbag or powertrain applications, an appropriate reaction to an event may be required within a few milli or micro seconds. While related problems can be overcome by preloading internal memory with instructions from the external memory before the running task actually uses them, this may still be too late when there is insufficient bandwidth for loading. When the cache already contains the needed instruction (because it has been loaded earlier and not evicted since then), such preloading can be avoided. This makes the cache replacement strategy and the appropriate management of the cache eviction candidates a prime task for the cache controller element.

As previously mentioned, to accommodate variable sized load units, a single new load unit may require replacing one or more load units already stored in the internal memory. A single replaced load unit may provide space for one or multiple new load units. Thus, a single caching or load request may trigger none (when there is sufficient space free), a single (when a replaced load unit provides sufficient space for a new load unit), or multiple cache replacement operations (otherwise). These replacement operations are further named "evictions" because there is not a real replacement of an earlier load unit by another load unit, but an eviction of a load unit to gain space for a later storage of instructions from another load unit being loaded. Since there may be multiple such load units that need to be evicted after a single load request, an appropriate management of the potential candidates for this eviction is a prime concern. Otherwise the time and effort of finding a new candidate for an eviction may cause another unwanted delay for any load operation that requiring free space.

FIG. 1 illustrates a timeline showing the effect of managing variable sized load units, in particular the replacement of one load unit j 104 that is loaded and located between two other load units load unit i 102 and load unit k 106. The eviction of load unit j 104 will provide an equally sized free space 120. Later loading of the load unit m 112, load unit n 114, and load unit p 116 may fill the free space 120 while keeping the load unit i 102 and load unit k 106 in memory unmodified. After loading these three load units the remaining free space 130 may not be sufficient to load a later loaded load unit q 118. This basic problem is named fragmentation, and relates to the issue that there may be storage that cannot be used because it is not large enough for the next element to be stored. This form of fragmentation is referred to as external fragmentation. A usual solution for the fragmentation is the usage of equally sized allocation units, which is also referred as paging. In this case every allocation occupies an equally sized storage unit, the page. This arrangement suffers from inefficient memory use, since any storage occupies at least one storage unit. The resulting waste is called internal fragmentation.

Figure 2:
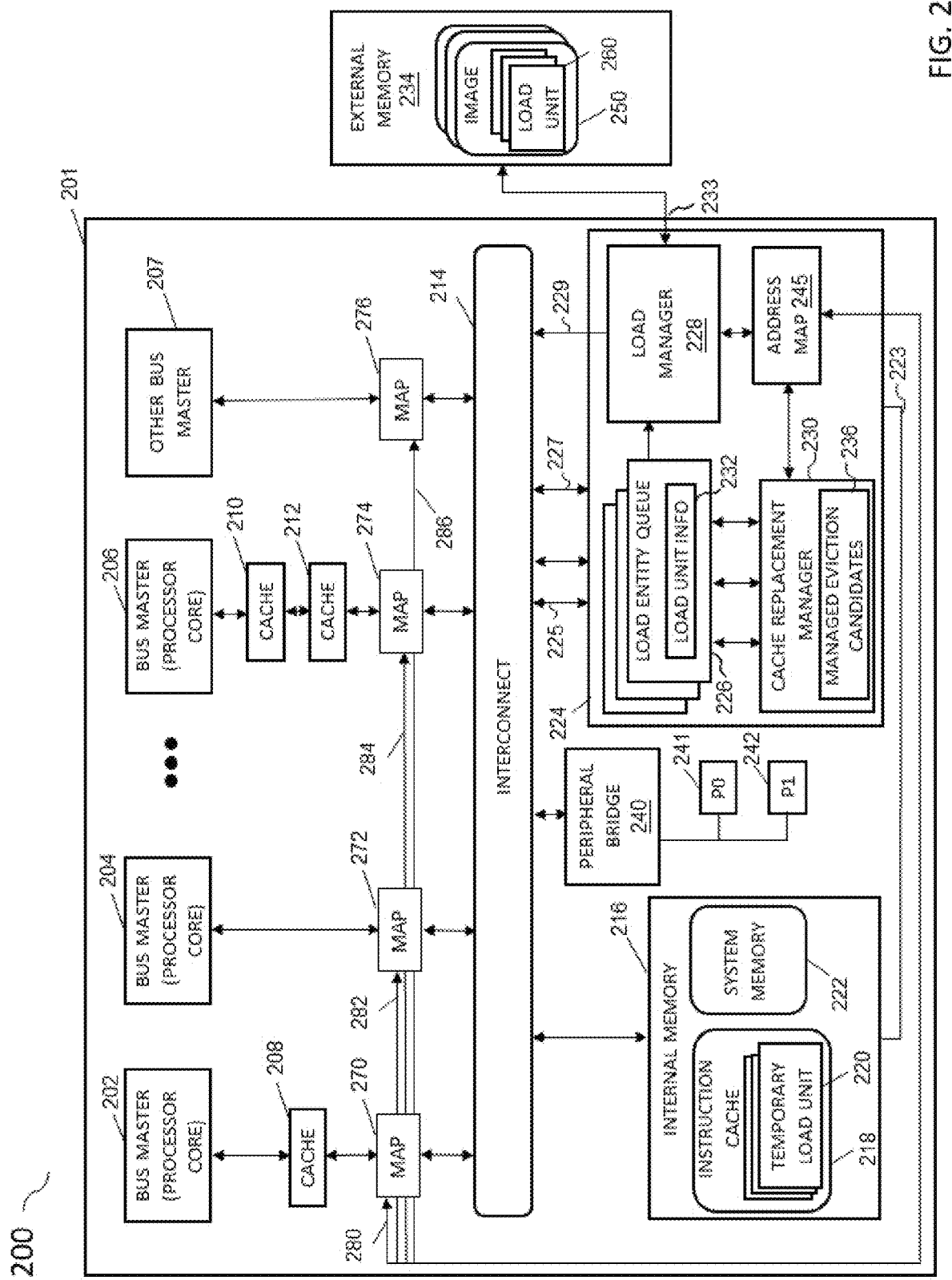
FIG. 2 illustrates a block diagram of a processing system in accordance with selected embodiments of the invention.

FIG. 2 illustrates a block diagram of processing system 200 in accordance with selected embodiments of the invention that includes an operating system task aware caching (OTC) subsystem for scheduling operations with variably sized load units to be performed within processing system 200. Processing system 200 includes microcontroller unit (MCU) 201 with two or more bus masters such as processor cores 202, 204, 206, and other bus masters 207 such as a direct memory access bus master and/or other suitable bus masters. Processor cores 202, 204, 206 may employ their own dedicated cache devices. In the embodiment shown, processor core 204 is not coupled to a dedicated cache, processor core 202 is coupled to a single dedicated cache 208, and processor core 206 is coupled to a hierarchy of dedicated cache 210, 212. Dedicated cache 208, 210, 212 can store data and instructions that are used often by respective processor cores 202, 206. Cache 208, 210, 212 are optional and may be available in addition to embodiments of the OTC caching subsystem disclosed herein.

Dedicated caches 208, 210, 212 are usually located in the vicinity of an associated processor core 202, 206 and attempt to avoid the latency incurred when processor cores 202, 206 communicate with other devices internal to the microcontroller 201, such as the internal memory 216. Dedicated caches 208, 210, 212 perform an on-demand loading and operate independently of OTC controller 224, which uses an anticipation mechanism and the internal memory 216 as storage to avoid the latency and bandwidth issues when accessing the external memory 234.

Bus masters 202, 204, 206, 207 and other interconnect and peripheral devices (not shown) can be operably coupled to interconnect 214, which may be a single interconnect or a set of specific interconnects. Interconnect 214 couples bus masters 202, 204, 206, 207 to communicate with bus slaves responding to access requests. Examples of bus slaves can include internal memory device 216, and peripherals represented by P0 241 and P1 242, which may be connected to interconnect 214 via peripheral bridge 240. Bus masters 202, 204, 206, 207 can be coupled to interconnect 214 via a respective map device 270, 272, 274, 276. A map device 270, 272, 274, 276 observes access requests of its associated bus master 202, 204, 206, 207, and may perform a mapping of the corresponding address for access requests when required.

Internal memory device 216 can include multiple memory blocks, which may be organized in random access memory (RAM) banks permitting concurrent accesses to different memory banks by multiple bus masters 202, 204, 206, 207. Internal memory device 216 provides storage for two functions: i) a first section is designated as system memory 222 that is utilized for storing the data for the applications executed within the processing system 200, and ii) a second section is designated as instruction cache 218 to hold instructions and constant data of the applications in structures referred to as temporary load units 220. The sections for instruction cache 218 and system memory 222 may span multiple banks and the content of a bank can be utilized by both sections; there is no relationship between the sections for instruction cache 218 and system memory 222 and the banks.

Temporary load units 220 contain a copy of the instructions and/or constant data associated with a corresponding load unit 260 of an application within an image 250 in external memory 234. The corresponding information about load units 260 of an image 250 may be specified, for example, in table format, that contains relevant properties for every load unit 260. The relevant properties can be stored separately from the instructions and constant data contained within load units 260 within metadata. Metadata may alternatively be stored in a different location in external memory 234.

Microcontroller 201 further includes OTC controller 224 that includes one or more load entity queues 226, load manager 228, address map device 245, and cache replacement manager 230, as well as other components that are not shown. The components of OTC controller 224 may be implemented as separate units that interact with other components that are also implemented separately to provide the functionality of OTC controller 224. OTC controller 224 is operably coupled to interconnect 214 via one or more register interface(s) 225, 227 as a peripheral and/or bus master to access other bus slaves, for example, internal memory 216. OTC controller 224 or its address map device 245 is also operably coupled to map devices 270, 272, 274, 276, where this coupling may utilize a common communication path or a dedicated communication path 280, 282, 284, 286 for every map device. In addition, or alternatively, one or more components of OTC controller 224 may be directly coupled to internal memory 216 via a direct connection 223 to access internal memory 216. OTC controller 224 (or load manager 228 when implemented separately) can be coupled to external memory 234 via interface 233.

Each instance of load entity queues 226 supports access requests from an associated bus master 202, 204, 206, 207. Load entity queues 226 may utilize a set of control and status registers specific to each load entity queue 226 in addition to common registers of OTC controller 224. Both the specific and common sets of registers can be accessed from interconnect 214 via one of register interfaces 225, 227. Each load entity queue 226 is further coupled to cache replacement manager 230 and to load manager 228. The interface to load manager 228 is used by a load entity queue 226 to request the loading of a load unit 260 from external memory 234.

During processing of load units 260, load entity queues 226 may store load unit information 232 to identify relevant information for at least one load unit 260 that is currently managed by a corresponding load entity queue 226. The relevant load unit information 232 can be metadata reflecting information for a subset of load units 260 contained within an image 250. Metadata for load units 260 can be stored along with or within image 250 in external memory 234, and may be temporarily loaded into internal memory 216. Load unit information 232 related to load units 260 being managed by load entity queue 226 may be read from internal memory 216 via bus master interface 227 or via direct connection 223 between internal memory 216 and OTC controller 224. Load unit information 232 may be stored in other locations in OTC controller 224 in other embodiments.

Two or more different types of load entity queues 226 may be implemented. A first type of load entity queue 226 can provide the full functionality required by the most complex type of bus master type, which will be usually be a processor core 202, 204, 206. Other types of loader entity queues 226 may provide only a subset or reduced form of functionality to align with specific needs of a particular bus master or provide a cost-effective implementation for bus masters implementing significantly less functionality. Load entity queues 226 that do not implement the full functionally are referred to as a "reduced" load entity queue 226.

Load manager 228 is coupled to communicate directly with the load entity queue(s) 226, address map device 245 and cache replacement manager 230. Load manager 228 may also provide a register interface (not shown) to interconnect 214 to interact with software and utilize a bus master interface to access internal memory 216, either through interconnect 229 or direct connection 223 to internal memory 216. Load manager 228 communicates over interface 233 with external memory device 234 to request the content of load units 260 from external memory 234 that are stored as temporary load units 220 in instruction cache portion 218 of internal memory 216.

Another element shown in OTC controller 224 is address map device 245, which is connected to load manager 228 and cache replacement manager 230. Upon startup of the OTC Controller 224 address map device 245 is initialized with the information about the part of the internal memory 216 that shall be utilized as instruction cache 218. For this purpose, map device 245 may receive corresponding information via a register interface 225 or 227. Map device 245 further receives information about the address ranges assigned to load units 260 within a selected image 250 in external memory 234. Corresponding information may also be determined from metadata (not shown) that is stored together with an image 250 within external memory 234 provided via register interface 225 or 227.

Address map device 245 is responsible for managing the content of the instruction cache 218, in particular the memory occupied by the temporary load units 220 where each temporary load units 220 is the result of loading a load unit 260 into the instruction cache 218, as well as any remaining free storage within the instruction cache 218 as needed. Address map device 245 is queried at least once for a free storage location when load manager 228 wants to store a first load unit 260 or a part of such a load unit in instruction cache 218. When there is sufficient free storage available in instruction cache 218, address map device 245 provides corresponding information regarding the space available to load manager 228. When there is not enough free storage available, address map device 245 provides an eviction request to cache replacement manager 230. Upon receiving such an eviction request, cache replacement manager 230 provides information about a temporary load unit 220 that is selected for eviction. The location of the load unit 220 selected for eviction is used by address map device 245 to free the storage space utilized by the load unit 220 selected for eviction. The free storage space can then be utilized for storing the instructions and constant data of load unit 260 as a temporary load unit 220 in instruction cache 218. By providing this functionality, address map device 245 manages the usage of free storage space within instruction cache 218 to store a copy of first load unit 260 as temporary load unit 220 and to release storage space upon eviction of temporary load unit 220.

Cache replacement manager 230 is coupled to address map device 245 and load entity queues 226. Cache replacement manager 230 is queried by address map device 245 when address map device 245 determines there is insufficient storage space available in instruction cache 218 for a new temporary load unit 220. The query may be triggered while a load request is processed by load manager 228 that requires storage of a temporary load unit 220. A corresponding query operation is triggered when an event occurs that requires one or more temporary load units 220 to be evicted.

To enable rapid response to an eviction requirement, cache replacement manager 230 can store information about a set of managed eviction candidates 236, which are processed when an eviction requirement is identified. Temporary load unit(s) 220 to be evicted from instruction cache 218 can be identified based on specified criteria, such as priority or other suitable criteria. The eviction process itself can be managed by address map device 245 as previously described herein. The set of managed eviction candidates 236 can be generated from eviction candidates identified by the load entity queues 226. For the purpose of selecting an eviction candidate, any load entity queue 226 may utilize corresponding load unit information 232.

External memory device 234 may be implemented using non-volatile memory or other suitable type(s) of memory device(s). External memory device 234 stores at least one image 250 that includes the instructions and constant data associated with at least one application program to be executed by processor core 202, 204, 206 implemented within microcontroller 201. At least one image 250 is structured into one or multiple load units 260 that may be used as a unit when loading instructions and constant data from external memory 234. Structuring image 250 into load units 260 can be accomplished, for example, by storing additional metadata (data about data) associated with load units 260 within external memory 234. The metadata may be stored separately (not shown) or as part of image 250. Load manager 228 accesses external memory 234 via interface 232 for loading a load unit 260 and writing the instructions and constant data included in the load unit 260 into the corresponding temporary load unit 220 within the instruction cache 218. The write operation from external memory 234 to instruction cache 218 may utilize a write path 229 through interconnect 214 or direct connection 223 to internal memory 216.

Microcontroller 201 and external memory device 234 are implemented on two different semiconductor devices, which may be within a single package or in different packages. Correspondingly the interface 233 between these two semiconductor devices may be a connection within a package or between two packages.

The size of the internal memory device 216 may be limited compared to the size of external memory device 234. External memory device 234 can hold multiple images 250 and every image 250 can hold instructions and data for one or multiple applications executed by processor cores 202, 204, 206. Execution of the applications is typically controlled by an operating system, and in many situations, the operating systems are required to adhere to stringent real-time conditions and are therefore referred to as real-time operating systems (RTOS). An application program that is controlled by a RTOS can use tasks to identify its units of execution. While images 250 holding the one or multiple applications executed by the microcontroller 201 may be stored in its entirety in external memory device 234, image 250 can be divided into contiguous segments of executable code, which are referred to as load units 260. A temporary copy 220 of the content a load unit 260 (holding instructions and/or constant data) can be loaded into instruction cache 218 for usage by a corresponding processor core 202, 204, 206 or other bus master 207. As such load units 260 are a segment of instructions and constant data that reflects one or more complete software functions within a contiguous address range. Temporary load units 220 loaded into the internal memory 216 is operable to be executed or otherwise processed by a processor core 202, 104, 206 or used by another bus master 207 within microcontroller 201.

Load units 260 can be specified by splitting the code and instructions of an application within an image 250 along functional boundaries along a set of contiguous address ranges. The functions may be associated with a task or shared by multiple tasks supported by at least one instance of a real-time operating system. The information about load units 260 can be specified in metadata, and may be produced manually during the software development process or by a tool or tool flow that automates the related generation process. Size restrictions can be defined for load units 260, e.g., a minimum size of 1 Kbyte and a maximum size of 63 Kbyte. Other restrictions (e.g., an address alignment of the start or end address) are not required. A preferred order for loading a set of load units 260 may be defined by a load sequence that is also specified within the metadata. Any load sequence may comprise an arbitrary number of load units 260.

Bus masters 202, 204, 206, 207 and OTC controller 224 can perform their respective operations concurrently and independently of one another. For example, the loading of instructions and constant data from the external memory device 234 can be performed independent of the processing being performed by bus masters s 202, 204, 206, 207. This processing can be an execution of software by processor cores 202, 204, 206, which may itself be several software threads executed on multiple processor cores 202, 204, 206 or other processing performed by any other bus master(s) 207. The potential concurrency of operations is dependent on the corresponding hardware that is performing such an operation. Accessing external memory device 234 may be concurrent to any other operation. A potential collision may arise when accessing the internal memory 216. Here a conflict between an access by one of the bus masters and an access by the OTC controller 224 (for example, when writing the content of a load unit read from the external memory) is possible. However, the probability of conflicts can be significantly reduced e.g., by using a multi-ported memory or by utilizing a specific memory architecture, like memory interleaving, that enables multiple concurrent accesses.

MCU 201 is capable of retrieving data and instructions from external memory device 234 to replace temporary load units 220 in instruction cache 218. If one processor core 202, 204, 206 wants to replace a temporary load unit 220, but another processor core 202, 204, 206 does not, cache replacement manager 230 determines which load unit 220 will be replaced based on information from the operating systems of processor cores 202, 204, 206 and the tasks being executed in each of processor cores 202, 204, 206, as will be more fully described below. The size of internal memory 216 may be selected to accommodate smaller load units 220 having variable sizes while the rest of the instructions and data corresponding to portions of an application that are not planned for execution remain in external memory device 234. The result is that the size of internal memory 216 will be smaller than otherwise needed to accommodate all of the data and instructions associated with a particular application if external memory device 234 were not available.

Processing system 200 is capable of managing a set of cache eviction candidates to enable variable sized load units 260 for cache management, effectively decoupling the generation of cache eviction candidates from their usage for the cache eviction. This decoupling permits a larger time span between generating a cache eviction candidate and using the cache eviction candidate, which permits a more sophisticated search for a "more optimal" candidate. In contrast, traditional Level 1/Level 2 cache 208, 210, 212 that operate on demand have to provide the eviction candidate more or less instantly.

Figure 3:
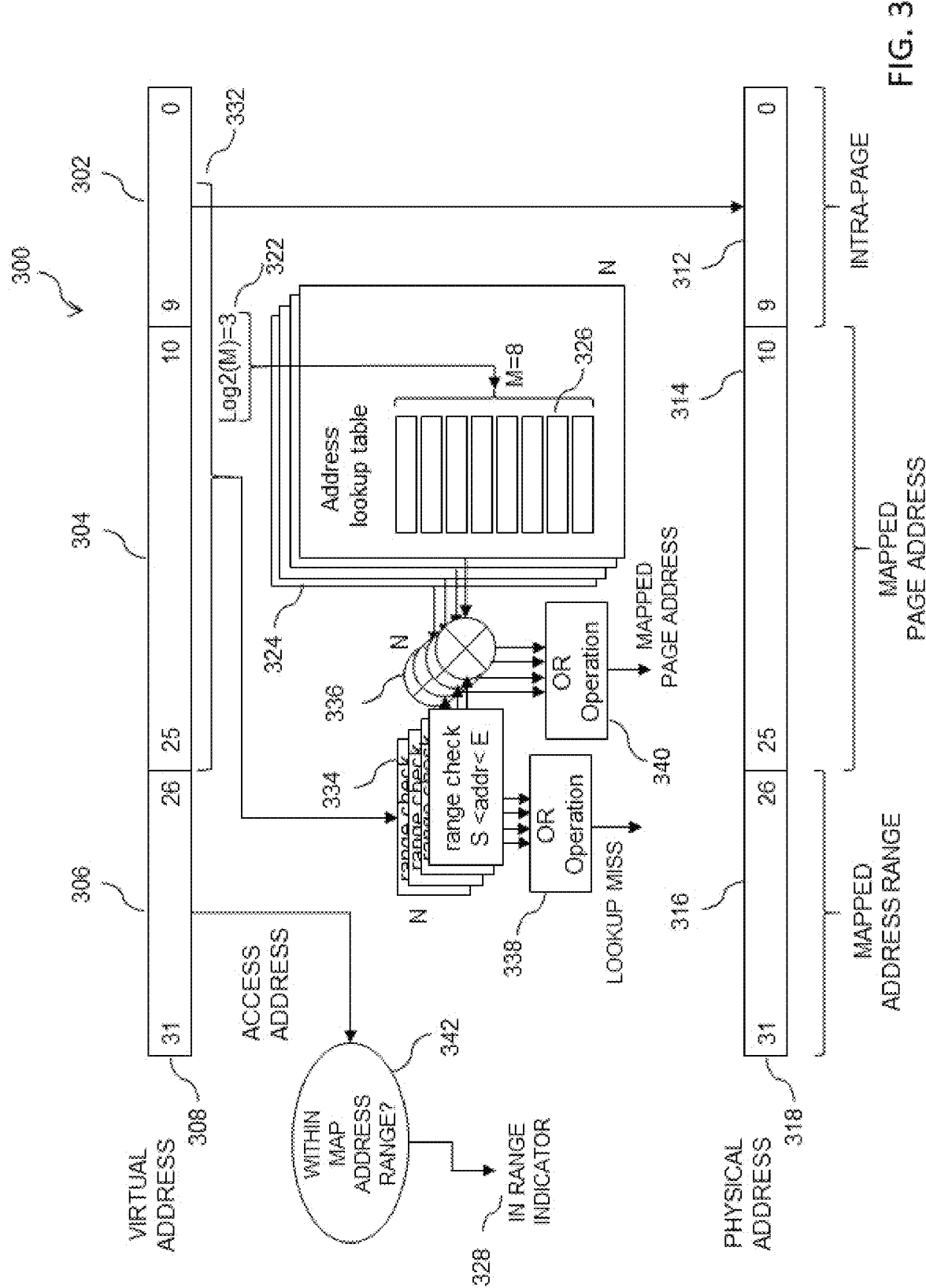
FIG. 3 illustrates basic aspects of the address mapping and the relationship between a virtual address and a physical address in accordance with selected embodiments.

Referring to FIGS. 2 and 3, FIG. 3 illustrates the mapping of a virtual address into its corresponding physical address in accordance with selected embodiments of the invention that may be performed by map devices 270-276 for accesses by bus masters 202-207 and within address map device 245 for loading by load manager 228. In this context the name "virtual address" identifies the address provided by a bus master 202-207 in its access request, while the name "physical address" identifies the address of the actual storage location of the requested information within a memory, e.g. the internal memory 216. The following illustration utilizes an equally sized virtual address, although an artisan skilled in the art will understand that different address sizes can also be supported by the described scheme.

The intent of the address mapping scheme depicted in FIG. 3 is to support load units 260 of variable size, which may or may not be loaded within instruction cache 218 in internal memory 216. Supporting variable sized load units 260 is beneficial when the criteria for forming a load unit 260 results in differing sizes, which is certainly the case for load units 260 related to application software that are structured along a functional boundary, since the size of a software function can vary greatly from a few byte to several thousand of bytes. Using variable size load units 260 is highly beneficial when the generation of equally sized load units causes unwanted overhead for this kind of information. For example, due to the time required for loading extra information in case of limited bandwidth, or due to wasted memory when a load unit 260 has to be padded to generate load units 260 of equal size.

In contrast to this, many address mapping implementations favor a direct mapping due to its simplicity of hardware implementation. A direct address mapping replaces a subset of the address bits of the request address with a mapped subset of these address bits, thus requiring equally sized load units for the address mapping. Such a scheme permits a fast implementation, since the replacement of bits is a simple operation, the only time-consuming implementation is the search of the corresponding address mapping information for a requested virtual address. A further benefit is the reduced amount of address mapping information required to store for this scheme, which can be limited to the amount of address bits being replaced. A potential problem of this scheme that is common with other address mapping schemes is the limited amount of address mapping possibilities that can be managed concurrently within hardware. This limitation is a result of the fact that the address mapping hardware is usually in the critical path for access requests, and a large amount of mapping possibilities requires an equally large amount of comparator or search elements that process the access request concurrently. However, using a large number of hardware elements for this purpose increases the load of an access request, which will ultimately slow this request down. Due to this issue, address mapping is usually performed by a very limited number of elements that concurrently check for an appropriate address mapping information.

Corresponding address mapping hardware is often implemented as a memory management unit (MMU). There are implementations of MMUs that support variable sized address mapping (also referred to as segmented MMU) and other implementations supporting a direct address mapping (also referred to as paged MMU). Most modern systems support a page-based address mapping scheme that divides the available memory into pages that are 4-64 Kbyte in size. Some schemes permit more than one page size, where an actual page size is always a power of two. One of the benefits of a paged MMU is that it mitigates the problem of fragmentation of memory, because a continuous range of virtual addresses (pages) can be mapped to several non-contiguous blocks of physical memory. As such it solves the problem of external fragmentation, which may be the result of a variable sized address range replacing another variable and differently sized address range. However, a paged MMU still suffers from internal fragmentation, which is the case when not all memory within a page can be used for storing information, because the address ranges are not equal to a page size. Also, splitting an address range into multiple pages requires a larger number of address mapping elements, which is a problem for implementing fast address mapping hardware. To overcome this issue, some MMU implementations use a translation lookaside buffer (TLB) that caches a limited amount of page table entries (PTE) for performing the actual address mapping.

In FIG. 3, an address mapping scheme 300 utilizes direct address mapping based on pages that also supports variable sized load units 260 in accordance with selected embodiments of the invention. The address mapping scheme 300 maps a "virtual address" 308 to a "physical address" 318 utilizing a page size of P bytes, where P is a power of two. In the example embodiment illustrated by FIG. 3, assume the value of P is 1024, resulting in small pages of one kilobyte size each and corresponding to 10 address bits ($1024=2^{10}$) to address the bytes within a page. A direct mapped address mapping leaves the intra-page address bits intact, thus the bits 9 to 0 (312) of the physical address 312 are equivalent to the bits 9 to 0 (302) of the virtual address 308. There is often the definition of a "mappable address range" that identifies an address range that specifies the permitted set of virtual pages that can be mapped. Address bits that are specific for this address range can be checked separately to identify a valid virtual address but these bits are not relevant for the address translation. The size of the "mappable address range" specifies the number of relevant address bits for the address mapping. In the example embodiment of FIG. 3 this address range is 32 Mbyte corresponding to the address bits 25 to 10 being relevant for the address mapping. The remaining address bits (31 to 26) within the virtual address 306 can be checked using decision element 342 to correctly address the mappable address range. When such a check is performed, an "in range" indication 328 may be generated that can be used to generate an error signal (outside mappable address range) or select an alternate mapping method that can be implemented for other address ranges.

The corresponding address bits (31 to 26) within the physical address 316 may be generated, dependent on the desired address mapping scheme. In a first scheme, bits (31 to 26) may be directly forwarded, effectively mapping the virtual pages within the mappable address range to a physical location. In another scheme, the bits may simply be replaced with address bits representing a different address range, effectively mapping the mappable address range to another (physical) address range. The corresponding address bits (31 to 26) within the physical address bits 316 may also be generated by translating the corresponding bits in the virtual address using some hardcoded or programmed formula, for example, by adding or subtracting a value.

The address mapping scheme 300 depicted in FIG. 3 also supports mappable address ranges having a size that is not a power of two. For this purpose, a further comparator (not shown) can be implemented for the mappable address bits (e.g. 25 to 10) to identify whether the address identified by these bits is within the mappable address range. However, the address mapping scheme in accordance with selected embodiments of this invention does not require such a comparison as mappable address ranges that are not a power of two and also a mappable address range that consists of a non-contiguous set of pages, can be handled.

The address mapping functionality can be implemented using address lookup tables 324 that are capable of mapping any address within a limited set of N load units, where N is a small number that will be typically below 64, and can be a power of two. The example embodiment depicted in FIG. 3 shows the concurrent processing of N=4 load units, which number has been chosen to simplify FIG. 3, however additional load units may be processed. One parameter in address lookup tables 324 is the page size (e.g. 1 Kbyte), which corresponds to several implementation specifics including the relevant address bits as previously described. A second, optional parameter in address lookup tables 324 is the maximum size of a load unit 260 in number of pages, further referred to as the parameter M. The purpose of the number of pages parameter is to limit the number of storage elements for storing the mapping information, which is required for an implementation having a reasonable size. The amount of storage elements is preferably also a power of two to permit a simpler and faster implementation. The corresponding maximum load unit size is then M−1 pages. The example embodiment depicted in FIG. 3 shows an implementation for a maximum load unit size that requires up to M=8 pages, resulting in a maximum load unit size of 7 Kbyte for purposes of illustration. Other example embodiments may support load unit sizes up to, for example, M=128 pages, resulting in a maximum load unit size of 127 Kbytes in case of a page size of 1 KByte.

One implementation of an address lookup table 324 may utilize the lower log 2(M) address bits 322 associated with a page as an index in a lookup table 324. For the example embodiment in FIG. 3 this would be log 2(8)=3 address bits capable of addressing M=8 storage elements. Using such an address mapping only requires filling the M=8 storage elements in the order of these address bits and not starting with the index 0. The benefit of this implementation is that the lookup operation can be a simple memory access using the 3 address bits (322) extracted from the virtual address 308 to address one of the M=8 storage elements (326) that contains the mapping information. In case of a smaller load unit 260 only the relevant storage elements 326 are filled.

A second process that can be started concurrently with address mapping using address lookup tables 324 includes a range check 334. The range check element 334 compares at least a portion of the relevant bits of the virtual address against the start address S and the end address E for one load unit 260. Range check element 334 is replicated N times, once for every load unit 260 that can be concurrently processed. In the example embodiment depicted in FIG. 3, there are four range check elements 334 (corresponding to the number of address lookup tables 324), however any suitable number of range check elements 334 may be used. Range check elements 334 utilize the full set of address bits associated with the page portion 304 of virtual address 308, and at least a subset of intra-page portion 302, depicted together as address bit range 332. Also checking a portion of the intra-page address bits 302 supports an arbitrary start address and end address up to byte boundary granularity for variable sized load units 260. When the system architecture requires less granularity, then a corresponding amount of least significant address bits can be ignored by range check 334 as is also depicted in FIG. 3. The result of any range check 334 is a single hit/no hit indication that can be combined with the result of the address lookup operation, e.g. by a replicated bit-wise AND operation 336 of the hit indicator with every address bit provided by the corresponding address lookup table 324. As a result there may be N results generated, where only an address lookup result that is within a valid range check 334 actually delivers an address. All N results can be combined, e.g. by an operation 340 that ORs every individual bit for all results to determine a resulting mapped page address 314. This result corresponds to an address mapping that can be employed on a variable sized load unit 260 with very high granularity (due to the range check), but this address mapping also supports direct address mapping.

The hit/no hit indicators generated by the N range check elements 334 can further be combined by OR operation 338 to identify a lookup miss. A lookup miss identifies a situation where none of the N address mapping elements can provide a valid address mapping information, which can be useful when these N elements implement a TLB function. In this case the lookup miss indication can be used to request the address mapping information for the load unit 260 associated with the request access address. Based on such a request, the address mapping information for the load unit 260 can be determined and loaded into a TLB function. In this case, the content of the address lookup tables 324 and the set of start and end addresses {S,E} for every load unit are the TLB information of the TLB function in some embodiments. As with other TLB functions, the start address S, the end address E, and the address mapping information for the request address are provided by an external entity.

The address mapping scheme 300 depicted in FIG. 3 enables an implementation of an address mapping functionality for variable sized load units 260 that utilizes a direct address mapping scheme, which combines the benefits of paged address mapping with the flexibility of a segmented MMU. It further enables an implementation of a TLB function that only records the minimum amount of information for a load unit 260 (the start and end address, and the address mapping information for every page). There is no need to record the linkage information between the pages used to store a load unit 260 within the TLB, which significantly reduces the amount of data storage required. When this address mapping scheme utilizes the lookup miss to request an update of the TLB information for the requested address, then any corresponding error handling can be managed by the entity providing this information. Furthermore, address mapping scheme 300 only has the notion of load units 260 and the pages used to store associated information, and can work with one or multiple mappable address regions and support a non-contiguous set of mappable address regions. Address mapping scheme 300 further fully supports a split page allocation scheme that also avoids or at least minimizes the amount of internal fragmentation, as further described herein.

Figure 4:
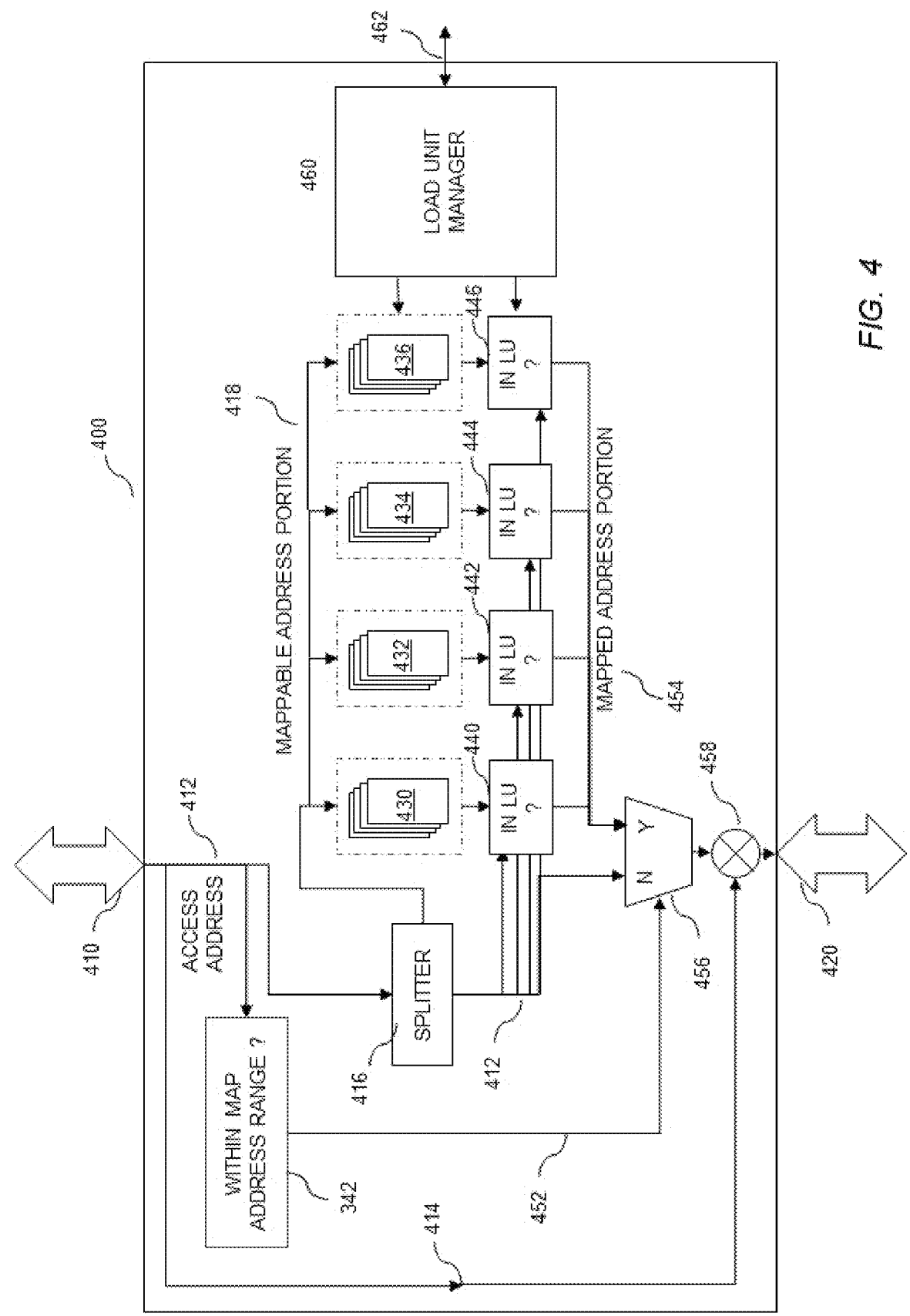
FIG. 4 illustrates a map device that can be used in the processing system of FIG. 2 in accordance with selected embodiments.

Referring to FIGS. 2 and 4, FIG. 4 illustrates a block diagram of an embodiment of map device 400 that can be used to implement map devices 270, 272, 274. Map device 276 may have different or fewer components for bus masters 207 that do not require all the functionality of map devices 270, 272, 274 for processor core bus masters 202, 204, 206.

Map device 400 is operably coupled via interface 410 to present access requests by the associated bus master, e.g. bus master 202 for map device 270 or associated cache(s) e.g., cache 208 in FIG. 2. Map device 400 is further operably coupled via interface 420 to present access requests to interconnect 214. Most information associated with an access request provided by an associated bus master 202, 204, 206, 207 via interface 410 is either passed unmodified by map device 400 via connection 414 to interface 420 or bypasses map device 400 completely. Only a portion of signals related to access address 412 is managed by map device 400 and may be later combined with other signals bypassed via connection 414 within combination element 458 to form a new, altered access address and optionally the original access address (or a portion of it that has been altered). When the processing by map device 400 cannot be performed in the same cycle, then combination element 458 can delay all other signals sent via connection 414 by the processing time required by map device 400 to insure all signals related to the modified access request are presented at the interface 420 at the correct time.

A first processing of the access address 412 by map device 400 is performed by decision element 342 to determine whether the access address is within the map address range. When the access address 412 is not within the map address range, output from decision element 342 controls multiplexer 456 to forward the unaltered access address to combination element 458. In addition, or alternatively, decision element 342 may perform further checks and, dependent on the result of the additional checks, reject the access address 412 by generating an error response (not shown). When decision element 342 determines an access address is within the map address range, multiplexer 456 is controlled to deliver mapped address portion 454 to combination element 458. Mapped address portion 454 is then combined with the unaltered access information from connection 414 associated with the access request.

Mapped address portion 454 of the access address is generated by a second processing of access address 412 by map device 400 using a multiplicity of N element pairs (430,440), (432,442), (434,444), (436,446). Map device 400 shows N=4 such element pairs for simplicity reasons, a preferred embodiment of the invention may employ a larger amount of such element pairs that are preferably a power of two; e.g. 16, 32, or 64 such element pairs. The operation of element pairs (430,440), (432,442), (434,444), (436,446) can be performed concurrently when there is no dependency between the data they are processing, and only one of element pairs (430,440), (432,442), (434,444), (436,446) may deliver mapped address portion 454. When there is a dependency between the data element pairs (430,440), (432,442), (434,444), (436,446) are processing, then any of element pairs (430,440), (432,442), (434,444), (436,446) that provide a mapped address portion 454 can provide the same result. Other element pairs (430,440), (432,442), (434,444), (436,446) that deliver no valid result may provide a default value, e.g. an all 0 pattern that can be combined with a valid result by OR gates to form mapped address portion 454. Any element pair (430,440), (432,442), (434,444), (436,446) can process the information associated with a load unit 260.

Each element of element pairs (430,440), (432,442), (434,444), (436,446) can operate concurrently. The processing of element 430 processes a mappable address portion 418 that is extracted by a splitter element 416 from the access address 412 and delivered to the first element 430, 432, 434, 436 of all element pairs (430,440), (432,442), (434,444), (436,446). First element 430, 432, 434, 436 performs a lookup operation using mappable address portion 418 in address lookup tables 324 to determine the associated mapped address portion. For this purpose any first element 430, 432, 434, 436 can employ a set of M storage elements 326, where every such container element 326 stores the mapped address portion associated with a specific value for the mappable address portion. When the number M of container elements 326 is a power of two, this lookup operation can be a simple access to an embedded memory or a register bank that utilizes a corresponding set of address bits log 2(M) as mappable address portion. Map device 400 shows M=4 such storage elements 326 for simplicity, however additional storage elements 326 that are preferably a power of two; e.g. 8, 16, 32, 64, 128, or 256 may be used.

The result of this lookup operation is forwarded by first elements 430, 432, 434, 436 to respective second elements 440, 442, 444, 446.

The processing of second elements 440, 442, 444, 446 can begin concurrently with processing by first elements 430, 432, 434, 436. Second elements 440, 442, 444, 446 perform a range check of the access address 412 forwarded unaltered by the splitter 416 against a lower and upper address that is recorded for the associated load unit 260 within the second element; e.g. the element 440. This range check corresponds to range check 334 in FIG. 3 and may utilize the full address provided, or only a portion of the address that does not reflect address bits associated with the mappable address range as shown in FIG. 3. It may also ignore less significant address bits that are not relevant due to architectural considerations. For example, the address bits 1 and 0 are not relevant when a bus master 202, 204, 206, 207 can only perform 32 bit word accesses. The recorded upper and lower address boundaries of the associated load unit 260 may be restricted accordingly. When the range check performed by second elements 440, 442, 444, 446 determines the access address is within the boundaries defined by the lower and upper address of the load unit, the result of first elements 440, 442, 444, 446 is forwarded as a mapped address portion.

The management of the data utilized by the set of element pairs (430,440), (432,442), (434,444), (436,446) (address map information within the N×M storage elements 326 (FIG. 3), and the M upper and lower address boundaries) is performed by load unit manager 460 that receives corresponding information for a load unit 260, and determines an element pair (430,440), (432,442), (434,444), (436,446) to store the information associated with load unit 260. Load unit manager unit 460 may further block or stall the operation of map device 400 when there is no appropriate address mapping information available for an access address or when the content of an element pair (430,440), (432,442), (434,444), (436,446) is being updated to ensure a consistent operation. This block or stall condition can continue until the appropriate address mapping information is made available or an error condition has been determined. In the latter case, an error or abort signal (not shown) may be utilized to terminate the illegal access request. Load unit manager 460 is further operable to request information associated with an access address via communication interface 462. For this purpose interface 462 is coupled to communicated with the OTC controller 224 via a shared or a dedicated communication channel, e.g. channel 280 shown in FIG. 2.

Figure 5:
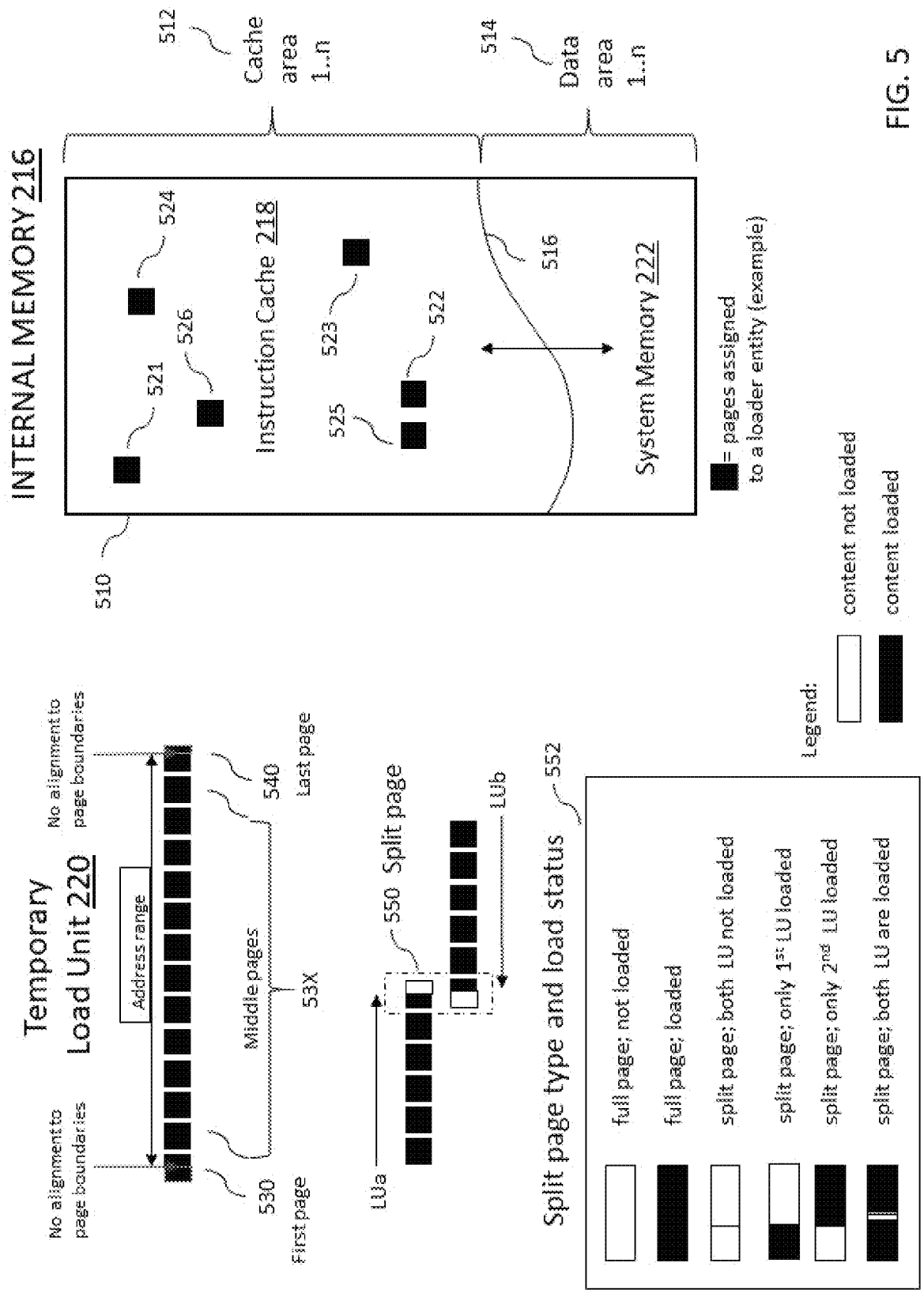
FIG. 5 illustrates examples of possible configurations for storing load units in internal memory in the processing system of FIG. 2 in accordance with selected embodiments.

Referring now to FIGS. 2, 4 and 5, in FIG. 5 elements 512-552 for managing instruction cache 218 are shown in accordance with selected embodiments of the invention. All these elements 512-552 are exploited by the address mapping scheme 300 depicted in FIG. 3 to inhibit external fragmentation and avoid or at least reduce the amount of internal fragmentation. Elements 512-552 further support a flexible split of the available internal memory 216 into one or multiple cache areas 512, and at least one data area 514. For example, by specifying a boundary 516 between system memory 222 available for application usage and instruction cache 218. The exemplary implementation of map device 400 as depicted in FIG. 4 can use elements 512-550 of FIG. 5 to optimize memory available as instruction cache 218 without limiting the address mapping capabilities or the corresponding system performance.

A first element of this management is the split of the (virtual) address range occupied by a load unit 260 into multiple pages of equal size, as depicted in the upper left of FIG. 5. In a preferred embodiment this page size is defined by a hardware parameter and is small enough to enable a fine granular address mapping, e.g. 1 Kbyte, but larger than the cache line of a traditional L1 or L2 cache (which is usually in the range of 16-64 byte). The start address of any such page is naturally aligned, e.g. by using a start address having bit 9:0 set to zero for a 1 kByte page. Because there is no limitation to the start or end address of a temporary load unit 220, any temporary load unit 220 may start or end anywhere within such a page, which is depicted at the first page 530 and the last page 540 of temporary load unit 220 shown. Any page that is not a first or last page is further named a middle page 53X and any middle page 53X is always assigned completely to a single temporary load unit 220. The content of any of the equally sized pages, when loaded from the external memory 234, can be stored into a memory page within instruction cache 218. The location of the memory pages can be dispersed over instruction cache 218 as is depicted in internal memory 216 of FIG. 5 to show an exemplary sequence of memory pages 521, 522, 523, 524, 525, 526. This split of a load unit into multiple equally sized pages eliminates any possibility of external fragmentation.

The start address and the end address of temporary load units 220 can be freely selected in accordance with the needs of the application associated with a temporary load unit 220. In addition, no size limitation is imposed on a temporary load unit 220, however such a limitation may be a result of the implementation of map devices 270-276, as shown in the exemplary map device 400 depicted in FIG. 4. Therefore, a potential limitation of the size of a temporary load unit 220 is considered an optional, non-essential limitation that may be used to optimize the hardware implementation. A size limit that is large enough to not become limiting may be chosen.

A second element of instruction cache management is a split page feature, which requires every temporary load unit 220 to be the same or larger in size as a single memory page. This limit ensures that any memory page is assigned to either exactly one or a maximum of two load units. For the intended use case of an instruction cache 218 that is structured along one or multiple function boundaries, it is always possible to combine more functions to form a larger temporary load unit 220 that fulfills this requirement. FIG. 5 depicts an example of a split page 550 that is shared between a first temporary load unit 220 (LUa) and a second temporary load unit 220 (LUb). It is important to note that the split unit definition corresponds to pages within the mappable address range.

Using this limitation, any first or last page of a temporary load unit 220 may be shared with another temporary load unit 220, resulting in two page types: a full page that is not shared between temporary load units 220 but assigned to a single temporary load unit 220 or not assigned at all, and a split page that is shared between a temporary load unit 220 and another temporary load unit 220 or an unassigned area. This page type classification is assigned to every page within the mappable address range that defines the complete set of virtual addresses that can be mapped.

Another attribute used to manage space in instruction cache 218 is a load status of a page, which corresponds to the assignment of a memory page within internal memory 216 to receive the content of the associated temporary load unit(s) 220. Any full page is either loaded or not loaded. Any split page may hold the content associated with one or both temporary load units 220 or no content. A full page that is not loaded and a split page that has not loaded any temporary load unit 220 is not assigned to any memory page in instruction cache 218. All other combinations of page type and page status are mapped to exactly one memory page within internal memory 216. Of these only a split page having only one of its two assigned temporary load units 220 loading is partially loaded. Any full page that is loaded and any split page having the content of both temporary load units 220 loaded is completely occupied. This optimizes the amount of memory that is not usable due to internal fragmentation.

FIG. 5 further illustrates potential states 552 of a full and a split page dependent on its load status. These states are: a full page that is either i) not loaded or ii) loaded, or a split page where iii) both temporary load units 220 are not loaded, iv) only the first temporary load unit 220 is loaded, v) only the second temporary load unit 220 is loaded, or vi) both temporary load units 220 are loaded. The special case where a page is not assigned to a temporary load unit 220 is equivalent to a full page not loaded, and any split page where a single temporary load unit 220 only occupies a part of this page and the other part is unassigned is equivalent to case iii) when the single temporary load unit 220 is not loaded or case iv) or v) when the single temporary load unit 220 is loaded. The above list assumes split pages are utilized by instances of temporary load unit 220 in adjacent address ranges, which is a result of the minimum size limit.

The benefit of the split page features is the significant reduction of internal fragmentation. At a minimum every split page is used at least 50% when there is only one temporary load unit 220 loaded, every time both temporary load units 220 assigned to a split page have been loaded then there is no internal fragmentation at all. Furthermore all management information associated with a physical memory page can be stored uniquely for every memory page; there is no requirement to record extra information for the corresponding information associated with two temporary load units 220 assigned to a split page. This is possible because there is dedicated information for a full page, and also a split page can exploit this scheme by defining the assignment of the associated information to either the temporary load unit 220 at the upper address or the temporary load unit 220 at the lower address. When the information associated with the other temporary load unit 220 is requested for a split page, then this data can be extracted by either requesting the information for the previous physical memory page (in case of an assignment to the upper address temporary load unit 220) or for the following physical memory page (in case of an assignment to the lower address temporary load unit 220). This permits the storage of unique information, also in case of a split page.

Figure 6:
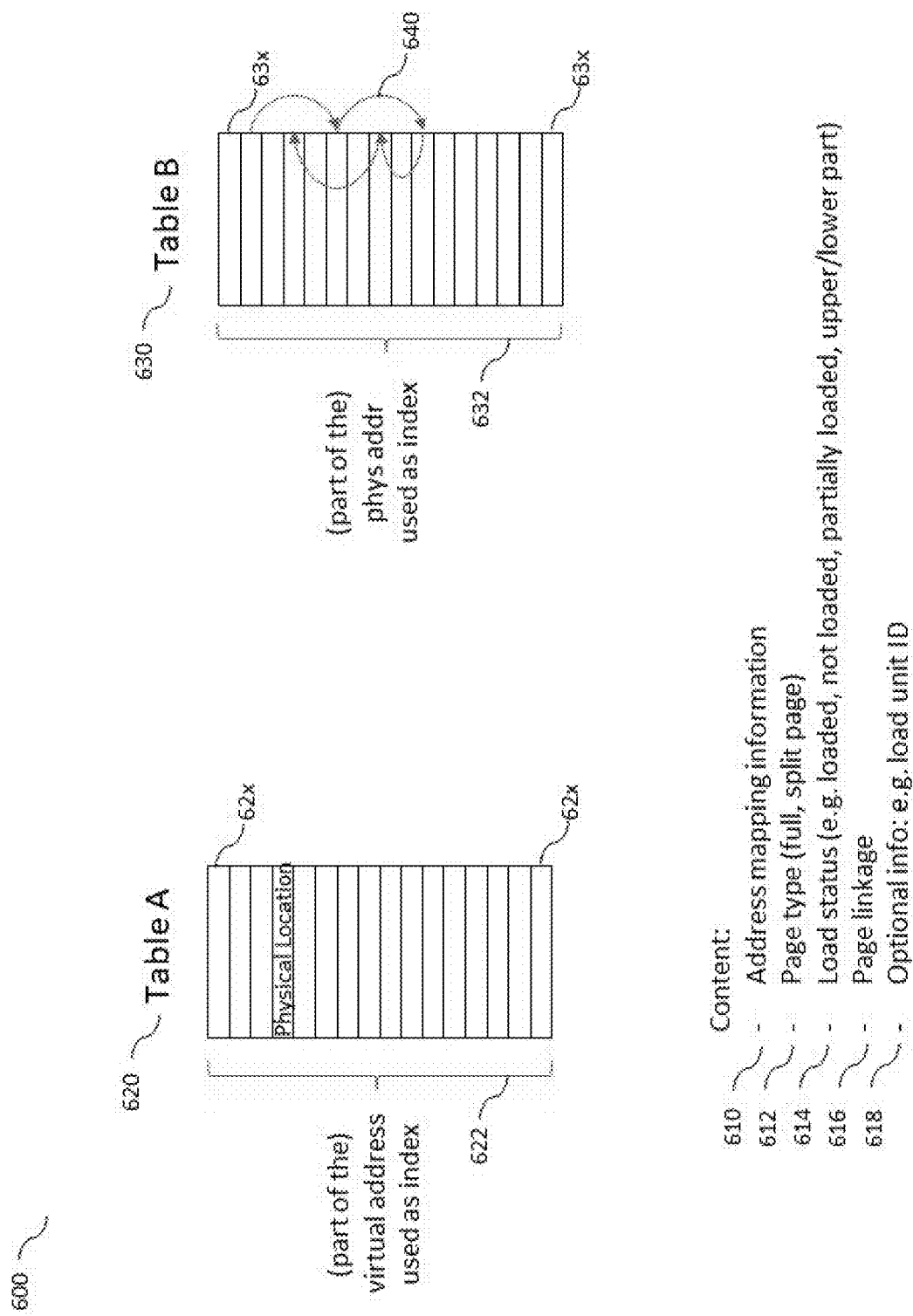
FIG. 6 illustrates requirement management information for a cache management operation in the processing system of FIG. 2 in accordance with selected embodiments of the invention

Referring now to FIG. 6, information 600 for cache management is shown in accordance with selected embodiments of the invention. Functionally, the cache management information 600 represents three essential aspects and a beneficial aspect for every page that are detailed below, and may further include optional information, e.g. a load unit identifier 618.

A first aspect of the cache management information 600 is address mapping information 610, which identifies the address or offset of the memory page in the internal memory 216 (FIG. 2) that holds the content of a page in the mappable address range. Every page in the mappable address range may be mapped to a physical location in internal memory 216, which requires a corresponding number of storage elements for recording this information:

number of entries:=<size of the mappable address range>/

Table A 620 implemented in internal memory 216 provides a corresponding number of words, thus that the part of the virtual address that corresponds to the page (e.g. segment 304 in FIG. 3) can be used as index 622 to address the words 62x of internal memory 216. Any storage element within this table can at least contain the set of address bits required to identify the memory page in internal memory 216 to which this page is being mapped. The corresponding information may omit the intra page bits (e.g. segment 302 of virtual address 308 in FIG. 3) and higher order address bits that are not mapped (e.g. segment 306 of virtual address 308 in FIG. 3), thus only holding the mapped address portion (e.g. segment 314 of physical address 318 in FIG. 3). When physical RAM implementing internal memory 216 can be addressed by a smaller number of address bits, then the size of the mapped physical address portion (e.g. segment 314 of physical address 318 in FIG. 3) may be smaller than the corresponding portion of virtual address 308 (e.g. segment 304 of virtual address 308 in FIG. 3). Using such a dense encode, every word 62x of instruction cache 218 may require only a subset of the bits required to form a physical address that is required to be used when mapping a virtual address.

Additional elements of cache management information 600 include page type 612 that identifies either a full or a split page, and load status 614 that identifies either a loaded, a not loaded or a partially loaded page. In case of a partially loaded page, it may be required to identify whether the upper or lower part of the page is loaded. Corresponding information can be made available for every page within the mappable address range. Combining the information associated with these additional elements with the address mapping information 610 within the Table A 620 may also permit usage of special encodings of the address mapping information 610 to reflect special combinations of page type and load status instead of a complete encoding of all states, which may save space.

A third aspect of the cache management information 600 is page linkage 616, which can be used for two purposes: a) to link all available free pages and b) to link all pages assigned to a temporary load unit 220. The linkage of all available free pages avoids the need to search for free pages; only the next page in the free list needs to be determined. The linkage of all pages assigned to a load unit avoids the need to determine pages during the eviction of a temporary load unit 220. Since both aspects are mutually exclusive the same linkage information can be used for both requirements. Because both aspects are only of interest for memory pages within the internal memory 216, storing this data in a second table tableB 630 may permit further savings.

Instruction cache 218 is smaller than the size of the mappable address range. Therefore there is a high likelihood that there are significantly less memory pages in instruction cache 218 than in the mappable address range. Since page linkage information 616 is only required for the pages in instruction cache 218, the memory implementing Table B 630 can also be significantly smaller. Also for Table B 630 a corresponding part of the (in this case physical) address can be used to the corresponding word to determine the storage location associated with a memory page. Furthermore, the content of every word 63x within Table B 630 may also be a dense encoding that only records (physical) address bits of interest, equivalent to the storage within Table A 620. This content can then be used as a link pointer 640 to determine the next (physical) memory page for every word that has a corresponding linkage.

Alternative encodings of the cache management information 600 are also possible, also a combined storage by collapsing Table A 620 and Table B 630 (or its contents) into a single, differently encoded table. It is further possible to use an incomplete encoding of the above information or to use alternative sources to determine related data. For example, it is possible to determine the usage of a split page from a list of all temporary load units 220 by querying the start addresses. Any such encodings are possible but may result in some performance impact or a less optimal amount of storage required for this information.

Figure 7:
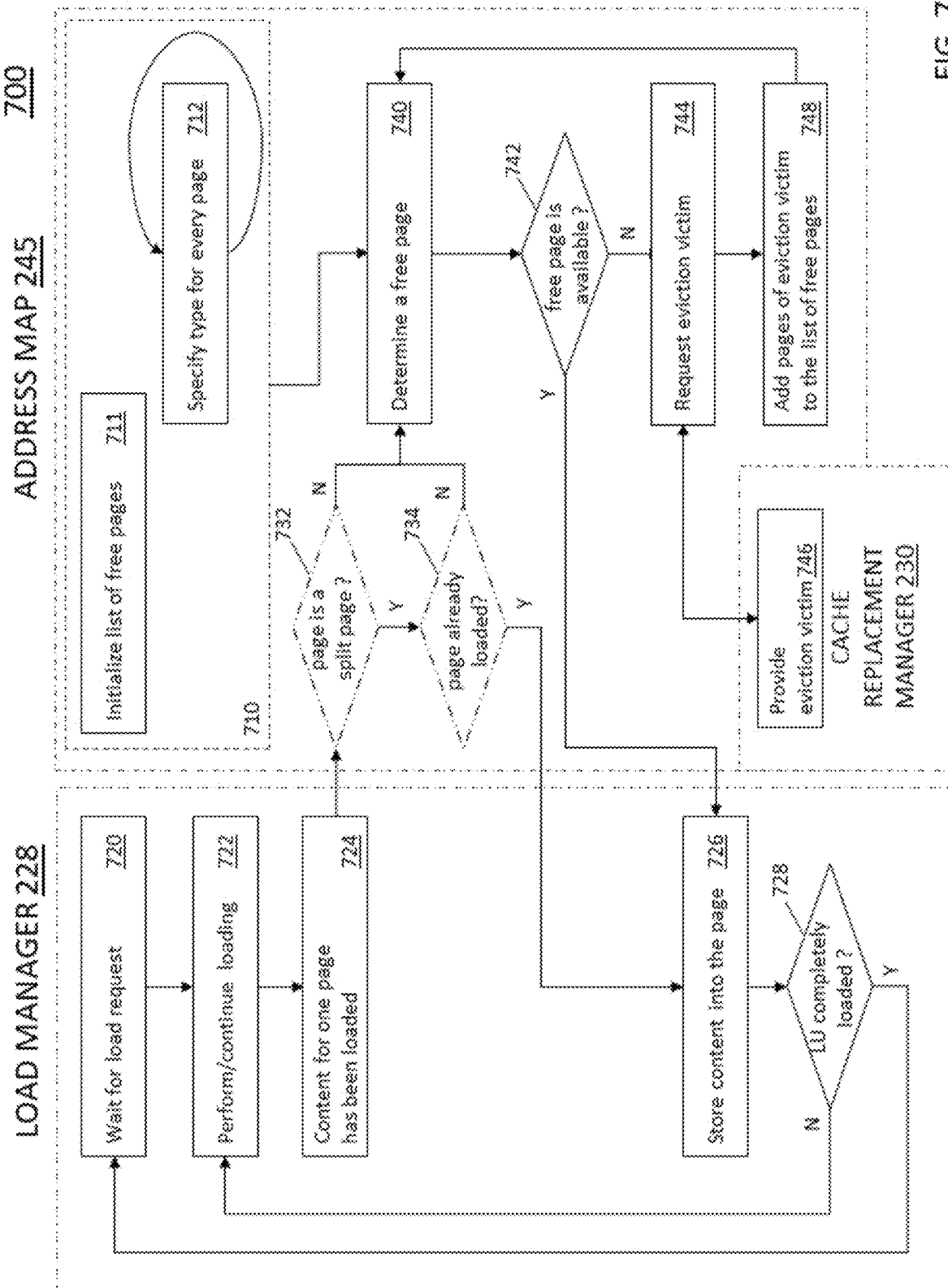
FIG. 7 illustrates a flowchart of a process for managing the instruction cache in internal memory in the processing system of FIG. 2 in accordance with selected embodiments of the invention.

Referring to FIGS. 2,3, and 7, FIG. 7 illustrates a flowchart of a method 700 for managing instruction cache 218 including related interactions between load manager 228, address map device 245, and cache replacement manager 230, in accordance with selected embodiments of the invention. Method 700 depicts initialization of the corresponding management information by address map device 245, the assignment of one or more memory pages within instruction cache 218 to a temporary load unit 220, and the release of memory pages assigned to a temporary load unit 220 by evicting a selected temporary load unit 220.

When OTC controller 224 is enabled, address map device 245 performs initialization process 710, which may be performed under software control by writing related control registers that provide the information required by initialization process 710. The main purpose of initialization process 710 is to record corresponding information in storage elements 326 managed by map devices 270-276. The table(s) 620, 630 depicted in FIG. 6 can be used to store the initialization information.

Initialization process 710 includes two functions that can performed by address map device 245 independently and in any order or concurrently: a) the specification of instruction cache 218 and b) the specification of the page type for every page within the mappable address range. The specification of instruction cache 218 utilizes one or more address ranges within internal memory 216 that can be specified e.g. by software via register programming. Initialization process 710 then assigns every memory page within an address range to the list of free pages in process 711. The second process 712 specifies the page type for every page within the mappable address range, for example, by a repeated specification of the address range assigned to a temporary load unit 220 by software via register programming. The address range can be utilized to determine whether every page is a full or a split page when the address range of the page is assigned to more than one temporary load unit 220. Process 712 also marks every such page as being unassigned, which reflects that the content of this page has not yet been loaded into internal memory 216. Since both processes 711 and 712 operate on a different data set, the set of memory pages within the internal memory 216, and the set of (virtual) pages within the mappable address range, they can be performed independently unless the internal tables recording both data sets have been combined.

The assignment of memory pages to a temporary load unit 220 is performed by address map device 245 upon request by load manager 228 while the content of a load unit 260 is being loaded from the external memory 234. When there is no ongoing load operation, load manager 228 waits for a load request 720, which may be provided at any time by a load entity queue 226. Upon receiving such a request, the load manager will perform the load operation 722, which reads the content of a requested load unit 260 from the external memory 234, usually within an internal buffer. Every time the content for one page in the virtual memory of the requested load unit 260 has been loaded by process 724, load manager 228 will request the storage location for this page from address map device 245. Upon receiving the appropriate storage location in form of a memory page within instruction cache 218, load manager 228 stores the content loaded into this memory page within process 726. The next page is loaded by continuing process 722 until load manager 228 determines that temporary load unit 220 has been completely loaded in process 728. Direct storage of the content loaded from the external memory 234 into a memory page is also possible by determining the memory page for performing the storage before starting/continuing the load operation itself.

Specific processing may be required in process 726 when the loaded content of a first or last page of a temporary load unit 260 is to be stored within a memory page of instruction cache 218. When such a page is a full page, then no special processing is required. When such a page is a split page, then only a portion of this page is assigned to the requested load unit, and only this portion may be written with the loaded content. Therefore process 726 may only write the upper part of a split page when this is the first page of a temporary load unit 220, and the lower part of a split page when this is the last page of a temporary load unit 220. Any part of the split page that is not related to the requested load unit, but either unassigned or assigned to another temporary load unit 220 is not be modified by process 726.

Corresponding processing by address map device 245 is depicted at the right side of FIG. 7. When load manager 228 requests a storage location for the content that has been loaded, address map device 245 first checks whether this page is a split page in process 732 and whether this page has already been loaded in process 734. Since only the first and the last page of a temporary load unit 220 can be a split page, both processes 732 and 734 can be omitted for any other page of a temporary load unit 220, which is depicted as optional using dashed lines. In this case processing unconditionally continues with process 740 to determine the next free page that can be assigned to a temporary load unit 220. In case of a split page that has already been loaded, it is not required to determine a free page, but the loaded content can be stored into the part of this split page that has not yet been loaded and is assigned to the requested load unit. When process 740 results in filling the other (not yet assigned) part of a split page, then the corresponding memory page will be basically a full page that is assigned to two temporary load units 220. This can be achieved by storing the loaded content into the selected memory page as has already been described in process 726.

In any other case address map device 245 can determine a free page in process 740 by retrieving the next page from the list of free pages generated by process 711. When there is a free page available, as determined in process 742, processing can continue with process 726 as has been already described earlier. When there is no free page available, e.g. because the list of free pages is empty, then address map device 245 requests a temporary load unit 220 to be evicted in process 744 from cache replacement manager 230. Upon such a request, cache replacement manager 230 determines a temporary load unit 220 to be evicted and provides the temporary load unit 220 to be evicted in process 746. The address map device 245 then evicts the corresponding temporary load unit 220 from instruction cache 218 and marks all pages associated solely with the evicted temporary load unit as free. The free pages are then added to the list of free pages in process 748.

Processing then continues by determining a free page within the process 740.

There are two special cases for the described processes that are related to the management of split pages. A first special case occurs when the first or last page of the temporary load unit 220 to be evicted is a split page that is also assigned to another load unit that has been loaded. In this case the process 748 does not mark this page as a free page, but changes the state of the page from a full page to a partially loaded page that is still assigned to the other loaded unit. Thus the corresponding eviction operation may provide less free pages than are occupied by the evicted temporary load unit 220. A second special case occurs when the eviction of the temporary load unit 220 in process 748 does not provide any free pages. This can occur when there are only two split pages assigned to the temporary load unit 220 to be evicted, and both pages are also assigned to another temporary load unit 220 that has been loaded. In this case only the state of these memory pages is changed from a full page to a partially loaded page, but none of these two pages is a free page after the eviction. In this case another iteration of the eviction processing is required.

By now it should be appreciated that in some embodiments, a processing system can comprise a microcontroller device and an external memory device external to the microcontroller device. The external memory device is coupled to the microcontroller device and stores one or more application codes. Each of the application codes comprises one or more load units, and the load units include executable instructions and/or data. The microcontroller device can include bus masters configured to execute the application codes, a random access memory (RAM) device internal to the microcontroller device and coupled to the bus masters via an interconnect. The RAM device is configured to store copies of a subset of the load units. An address mapping device can be coupled to an access path from the bus master to the RAM device. The address mapping device can be configured to modify a portion of an access request from a bus master that represents an address of the requested information. A cache controller device can be coupled to the RAM device and the external memory device. The cache controller device can be configured to partition a copy of a second one of the load units into one or more segments, wherein the segments have a length up to a page size of the RAM device. The cache controller device can further load the segments into one or more of the pages with available space in the RAM device, and maintain a record of the one or more pages into which the segments were loaded.

In another aspect, the size of each of the load units can be equal to or larger than a size of a single page in the RAM device.

In another aspect, two or more of the load units can have different sizes.

In another aspect, a start address of at least one of the segments in a page of the RAM device may not be a first address of the page.

In another aspect, the cache controller device can be further configured to evict a previously loaded copy of one of the load units from the RAM device to create available space in one or more pages in the RAM device.

In another aspect, the cache controller device can be further configured to allocate one segment associated with one of the load units to one of the pages, wherein the one segment occupies all of the one of the pages. The cache controller device can allocate one segment associated with one of the load units to one of the pages, wherein the one segment occupies only a first or second portion of the one of the pages and a remaining portion of the one of the pages is available as free space, and allocate two segments associated with two different load units to one of the pages.

In another aspect, the cache controller can be further configured to assign a load status to each page in the RAM device, the load status indicating one of: a page is available when no segment of one of the load units has been loaded into the page, the page is "in use" when at least one segment of one of the load units allocated to the page has been loaded into the page, and a page is available for storing additional content when a segment of one of the load units has been loaded into the page and there is additional space available to store a segment of another one of the load units.

In another aspect, the processing system can further comprise a first mapping table that specifies a physical location within the RAM device for at least some of the one or more pages that may receive at least one segment of a load unit.

In another aspect, one of the first mapping table or a second mapping table includes load status information that indicates whether: i) content of a page is not loaded, ii) the page holds a single segment and is loaded, iii) the page holds two segments and the two segments are loaded, iv) the page holds two segments and only one of the two segments associated with a lower part of addresses within the page is loaded, or v) the page holds two segments and only one of the two segments associated with an upper part of addresses within the page is loaded.

In another aspect, the mapping table can further include information to link all pages assigned to segments associated with a specified load unit in the RAM device.

In other embodiments, a method of managing variable size load units of application codes in a processing system can comprise identifying pages of a random access memory (RAM) device to store copies of load units from an external memory device upon request by a bus master in the processing system. The RAM device can be internal to an integrated circuit device that includes the bus masters, and the external memory device can be external to the integrated circuit device. The bus masters can execute the application codes, and each of the application codes can comprise one or more load units that include executable program instructions. At least some of the load units have different sizes from one another. A page type indicator can be determined for an identified page, wherein a first page type indicates whether the identified page is a split page to store a segment of each of two different load units.

In another aspect, each of the load units can be at least a page long. The method can further comprise storing segments of one of the load units in one of: a portion of a split page, and a page that is not a split page, and maintaining a list of pages storing the segments of the one of the load units.

In another aspect, the method can further comprise, when a request for a first load unit is received, reading contents of the requested first load unit from the external memory, splitting contents of the first load unit into one or more segments, and requesting a storage location for one segment of the requested first load unit in the RAM device. When the storage location is a split page, and a portion of the split page is already occupied by a second load unit, a remaining portion of the split page can be used to store the one segment. Otherwise, when the storage location is not a split page, a free page in the RAM device can be determined, usage of the determined free page as storage for the one segment can be recorded, and the one segment in the determined page of the RAM device can be loaded.

In another aspect, the method can further comprise, when a request for one of the load units is received, reading contents of the requested load unit from the external memory, requesting a storage location for one page of the requested load unit in the RAM device, determining a free page in the RAM device, loading the one page in the free page of the RAM device, and recording the storage location for the one page.

In another aspect, the method can further comprise, when the free page is a split page, assigning the at least a segment of one of the two load units to the split page, wherein an upper part of the split page is used to store a first page of the one of the two load units and a lower part of the split page is used to store a last page of the one of the two load units.

In another aspect, the method can further comprise determining a load status for each of the pages to indicate whether a page is loaded, not loaded, upper partially loaded, and lower partially loaded.

In another aspect, the method can further comprise updating linkage information for the one of more pages to indicate one of: assignment of a free page to store one of the one or more segments of a load unit, assignment of a split page to become a first or a last page storing at least one of the one or more segments of a load unit, and assignment of page assigned to a load unit being evicted to become a free page.

In another aspect, the method can further comprise, in response to the request by the bus master, using a portion of a virtual address in the request to determine whether a requested address is within a map address range of the identified pages.

In another aspect, the method can further comprise, in response to the request by the bus master, comparing a portion of the virtual address to a start and end address of a load unit to map the load unit to a physical address in the RAM device.

In another aspect, the method can further comprise, in response to a request by a bus master, using a first portion of a virtual address in the request to determine whether a requested address is within a map address range of the identified pages, using a second portion of the virtual address in the request to determine the storage location of the corresponding page and use this as a mapped address, and using a third portion of the virtual address that may overlap with the first and second portion of the virtual address, comparing the third portion to a start and end address of a load unit to identify correctness of using the mapped page address to determine the mapped address for the request by the bus master.

Although the described exemplary embodiments disclosed herein are directed to methods and systems which may be applied to Systems and methods for managing cache replacement, the present invention is not necessarily limited to the example embodiments illustrate herein, and various embodiments of the circuitry and methods disclosed herein may be implemented with other devices and circuit components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein may be implemented as software or operations on data within a computer memory, implemented with hardware circuitry, or firmware, or a combination of software, hardware and firmware. Such descriptions and representations are used by those skilled in the art to describe and convey the substance of their work to others skilled in the art. Microcontrollers such as MCU 201 and System(s)-on-a-Chip (SoC) are examples of small computer processing systems formed with integrated circuits. Each processing system contains one or more central processing units (CPUs), memory for storing executable software instructions and/or data, programmable peripherals such as timers, etc. The integrated circuits operate to execute software and/or firmware instructions, and/or to perform certain functions and/or store information using hardware circuits alone. The present disclosure is described with reference to MCU 201 and/or methods and processes performed on MCU 201, it being understood the present disclosure can find use in many types of computer processing systems and should not be limited to use in MCUs. The use of the term "device" herein refers to circuitry that stores information such as instructions and/or data and/or executes instructions in software or firmware, hardware circuits themselves, and/or a combination of circuitry for storing instructions and/or data, and/or performing functions using software, firmware, and/or hardware.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, device, article, or apparatus that comprises a list of elements does not include only those elements but may include other elements not expressly listed or inherent to such process, method, device, article, or apparatus.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

What is claimed is:

1. A processing system comprising:
a microcontroller device;
an external memory device external to the microcontroller device, the external memory device coupled to the microcontroller device and storing one or more application codes, wherein each of the application codes comprises one or more load units, and the load units include executable instructions and/or data;
the microcontroller device including:
bus masters configured to execute the application codes;
a random access memory (RAM) device internal to the microcontroller device and coupled to the bus masters via an interconnect, the RAM device configured to store copies of a subset of the load units;
an address mapping device coupled to an access path from the bus master to the RAM device, the address mapping device configured to modify a portion of an access request from a bus master that represents an address of the requested information;
a cache controller device coupled to the RAM device and the external memory device, the cache controller device configured to:
partition a copy of a second one of the load units into one or more segments, wherein the segments have a length up to a page size of the RAM device;
load the segments into one or more of the pages with available space in the RAM device;
maintain a record of the one or more pages into which the segments were loaded.

2. The processing system of claim 1, wherein the size of each of the load units is equal to or larger than a size of a single page in the RAM device.

3. The processing system of claim 2, wherein two or more of the load units have different sizes.

4. The processing system of claim 1, wherein a start address of at least one of the segments in a page of the RAM device is not a first address of the page.

5. The processing system of claim 1, wherein the cache controller device is further configured to:
evict a previously loaded copy of one of the load units from the RAM device to create available space in one or more pages in the RAM device.

6. The processing system of claim 1, wherein the cache controller device is further configured to perform each following operation independently of one another:
allocate one segment associated with one of the load units to one of the pages, wherein the one segment occupies all of the one of the pages;
allocate one segment associated with one of the load units to one of the pages, wherein the one segment occupies only a first or second portion of the one of the pages and a remaining portion of the one of the pages is available as free space; and
allocate two segments associated with two different load units to one of the pages.

7. The processing system of claim 1, wherein the cache controller is further configured to assign a load status to each page in the RAM device, the load status indicating one of:
a page is available when no segment of one of the load units has been loaded into the page, the page is "in use" when at least one segment of one of the load units allocated to the page has been loaded into the page, and a page is available for storing additional content when a segment of one of the load units has been loaded into the page and there is additional space available to store a segment of another one of the load units.

8. The processing system of claim 1, further comprising:
a first mapping table that specifies a physical location within the RAM device for at least some of the one or more pages that may receive at least one segment of a load unit.

9. The processing system of claim 8, wherein:
one of the first mapping table or a second mapping table includes load status information that indicates whether: i) content of a page is not loaded, ii) the page holds a single segment and is loaded, iii) the page holds two segments and the two segments are loaded, iv) the page holds two segments and only one of the two segments associated with a lower part of addresses within the page is loaded, or v) the page holds two segments and only one of the two segments associated with an upper part of addresses within the page is loaded.

10. The processing system of claim 8, the mapping table further includes information to link all pages assigned to segments associated with a specified load unit in the RAM device.

11. A method of managing variable size load units of application codes in a processing system comprising:
identifying pages of a random access memory (RAM) device to store copies of load units from an external memory device upon request by a bus master in the processing system, wherein
the RAM device is internal to an integrated circuit device that includes the bus masters, and the external memory device is external to the integrated circuit device,
the bus masters execute the application codes, and each of the application codes comprise one or more load units that include executable program instructions, and
at least some of the load units have different sizes from one another; and
determining a page type indicator for an identified page, wherein a first page type indicates whether the identified page is a split page to store a segment of each of two different load units.

12. The method of claim 11, wherein each of the load units is at least a page long, the method further comprising:
storing segments of one of the load units in one of: a portion of a split page, and a page that is not a split page; and
maintaining a list of pages storing the segments of the one of the load units.

13. The method of claim 11, further comprising
when a request for a first load unit is received,
reading contents of the requested first load unit from the external memory;
splitting contents of the first load unit into one or more segments;
requesting a storage location for one segment of the requested first load unit in the RAM device;
when the storage location is a split page, and a portion of the split page is already occupied by a second load unit, using a remaining portion of the split page to store the one segment, otherwise when the storage location is not a split page,
determining a free page in the RAM device,
recording usage of the determined free page as storage for the one segment; and
loading the one segment in the determined page of the RAM device.

14. The method of claim 11, further comprising
when a request for one of the load units is received,
reading contents of the requested load unit from the external memory;
requesting a storage location for one page of the requested load unit in the RAM device;
determining a free page in the RAM device;
loading the one page in the free page of the RAM device; and
recording the storage location for the one page.

15. The method of claim 13, further comprising
when the free page is a split page,
assigning the at least a segment of one of the two load units to the split page, wherein an upper part of the split page is used to store a first page of the one of the two load units and a lower part of the split page is used to store a last page of the one of the two load units.

16. The method of claim 13, further comprising
determining a load status for each of the pages to indicate whether a page is loaded, not loaded, upper partially loaded, and lower partially loaded.

17. The method of claim 13, further comprising
updating linkage information for the one of more pages to indicate one of:
assignment of a free page to store one of the one or more segments of a load unit;
assignment of a split page to become a first or a last page storing at least one of the one or more segments of a load unit; and
assignment of page assigned to a load unit being evicted to become a free page.

18. The method of claim 11, further comprising:
in response to the request by the bus master, using a portion of a virtual address in the request to determine whether a requested address is within a map address range of the identified pages.

19. The method of claim 11, further comprising:
in response to the request by the bus master, comparing a portion of the virtual address to a start and end address of a load unit to map the load unit to a physical address in the RAM device.

20. The method of claim 11, further comprising:
in response to a request by a bus master,
using a first portion of a virtual address in the request to determine whether a requested address is within a map address range of the identified pages;
using a second portion of the virtual address in the request to determine the storage location of the corresponding page and use this as a mapped address, and
using a third portion of the virtual address that may overlap with the first and second portion of the virtual address, comparing the third portion to a start and end address of a load unit to identify correctness of using the mapped page address to determine the mapped address for the request by the bus master.

* * * * *